(12) United States Patent
Liu et al.

(10) Patent No.: US 10,324,910 B2
(45) Date of Patent: Jun. 18, 2019

(54) CONTACT RECORD PROCESSING METHOD AND APPARATUS

(71) Applicant: Xiaomi Inc., Beijing (CN)

(72) Inventors: Guilin Liu, Beijing (CN); Changliang Wu, Beijing (CN); Peng Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 183 days.

(21) Appl. No.: 15/250,464

(22) Filed: Aug. 29, 2016

(65) Prior Publication Data

US 2017/0060916 A1 Mar. 2, 2017

(30) Foreign Application Priority Data

Aug. 31, 2015 (CN) .......................... 2015 1 0549128

(51) Int. Cl.
| | |
|---|---|
| *G06F 16/00* | (2019.01) |
| *G06F 16/215* | (2019.01) |
| *H04W 8/26* | (2009.01) |
| *H04M 1/2745* | (2006.01) |
| *G06F 16/2455* | (2019.01) |
| *H04W 4/60* | (2018.01) |
| *H04M 1/57* | (2006.01) |
| *H04W 8/20* | (2009.01) |

(52) U.S. Cl.
CPC ........ *G06F 16/215* (2019.01); *G06F 16/2455* (2019.01); *H04M 1/274508* (2013.01); *H04M 1/274516* (2013.01); *H04M 1/274533* (2013.01); *H04M 1/274583* (2013.01); *H04W 8/26* (2013.01); *H04M 1/575* (2013.01); *H04W 4/60* (2018.02); *H04W 8/205* (2013.01)

(58) Field of Classification Search
None
See application file for complete search history.

(56) References Cited

U.S. PATENT DOCUMENTS

| | | | |
|---|---|---|---|
| 2002/0012426 A1* | 1/2002 | Gupton | H04M 3/436 379/210.02 |
| 2004/0267590 A1* | 12/2004 | Clark | G06F 21/121 705/26.35 |
| 2006/0229063 A1 | 10/2006 | Koch | |
| 2006/0286971 A1 | 12/2006 | Maly et al. | |
| 2009/0036163 A1 | 2/2009 | Kimbrell | |

(Continued)

FOREIGN PATENT DOCUMENTS

| | | |
|---|---|---|
| CN | 103347257 A | 10/2013 |
| CN | 103747147 A | 4/2014 |

(Continued)

OTHER PUBLICATIONS

International Search Report of PCT Application No. PCT/CN2015/097805, dated May 24, 2016 (4 pages).

(Continued)

*Primary Examiner* — Son T Hoang
(74) *Attorney, Agent, or Firm* — Finnegan, Henderson, Farabow, Garrett & Dunner LLP

(57) ABSTRACT

A contact record processing method includes: detecting whether a use time of a phone number stored in a contact record is greater than a use term of the phone number; and deleting the phone number from the contact record when the use time is greater than the use term.

5 Claims, 11 Drawing Sheets

(56) References Cited

U.S. PATENT DOCUMENTS

| | | |
|---|---|---|
| 2009/0156186 A1 | 6/2009 | Lyle |
| 2010/0216442 A1* | 8/2010 | Kim .................... H04M 1/2745 455/415 |
| 2011/0244838 A1 | 10/2011 | Chang |
| 2013/0251128 A1 | 9/2013 | Zhang et al. |
| 2015/0072616 A1 | 3/2015 | Rong et al. |

FOREIGN PATENT DOCUMENTS

| | | | |
|---|---|---|---|
| CN | 105100355 | A | 11/2015 |
| EP | 1672883 | A1 | 6/2006 |
| GB | 2341040 | A | 3/2000 |
| JP | 2000-324226 | A | 11/2000 |
| JP | 2002-247205 | A | 8/2002 |
| JP | 2003-047051 | A | 2/2003 |
| JP | 2007-306222 | A | 11/2007 |
| JP | 2008-536457 | A | 9/2008 |
| JP | 2009-094909 | A | 4/2009 |
| JP | 2010-268178 | A | 11/2010 |
| KR | 10-2007-0120153 | A | 12/2007 |
| RU | 2012139960 | A | 3/2014 |
| RU | 2013108265 | A | 8/2014 |
| WO | WO 2009/017850 | A1 | 2/2009 |

OTHER PUBLICATIONS

Extended European Search Report for European Application No. 16186562.1, dated Jan. 24, 2017.
English translation of International Search Report of PCT Application No. PCT/CN2015/097805, dated May 24, 2016.
Office Action for Russian Application No. 2016116249/07(025487) dated Jun. 8, 2017.
European Office Communication dated Feb. 5, 2019, in counterpart European Application No. 16 186 562.1-1214.

* cited by examiner

CONTACT RECORD PROCESSING METHOD AND APPARATUS

CROSS-REFERENCE TO RELATED APPLICATIONS

This application is based upon and claims priority to Chinese Patent Application No. 201510549128.8, filed on Aug. 31, 2015, the entire contents of which are incorporated herein by reference.

TECHNICAL FIELD

The present application relates to the field of communications technologies, and more particularly, to a contact record processing method and apparatus.

BACKGROUND

With the development of mobile communications technologies, people are able to have conversations with others anytime and anywhere, which brings great convenience to their daily life. At present, virtual SIM (Subscriber Identity Module) card services are becoming more and more popular. After buying a virtual SIM card service, a user obtains a temporary mobile phone number. The temporary mobile phone number becomes invalid after the deadline of the use term. It is not easy to manage an address book of a phone with a virtual SIM card.

SUMMARY

According to a first aspect of the present disclosure, there is provided a contact record processing method. The method includes: detecting whether a use time of a phone number stored in a contact record is greater than a use term of the phone number; and deleting the phone number from the contact record when the use time is greater than the use term.

According to another aspect of the present disclosure, there is provided an apparatus for processing a contact record. The apparatus includes a processor and a memory for storing instructions executable by the processor. The processor is configured to: detect whether a use time of a phone number stored in a contact record is greater than a use term of the phone number; and delete the phone number from the contact record when the use time is greater than the use term.

According to another aspect of the present disclosure, there is provided a non-transitory computer-readable storage medium having stored therein instructions that, when executed by one or more processors of an apparatus, cause the apparatus to perform: detecting whether a use time of a phone number stored in a contact record is greater than a use term of the phone number; and deleting the phone number from the contact record when the use time is greater than the use term.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Figure 1:
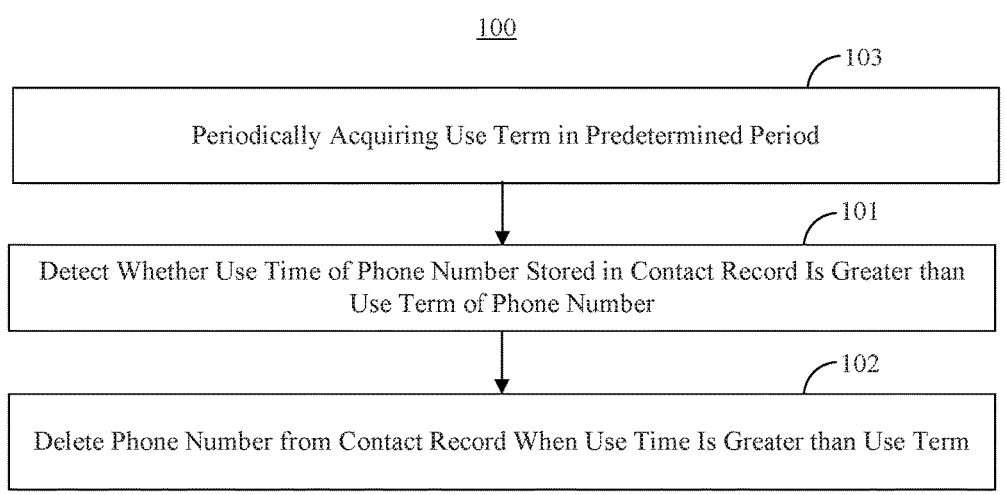
FIG. 1 is a flowchart illustrating a contact record processing method according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is solely for the purpose of describing particular embodiments and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms first, second, third, etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to determining," depending on the context.

Contact record processing methods consistent with embodiments of the present disclosure may be performed by a terminal that is capable of automatically managing a phone number having a use term. A terminal according to embodiments of the present disclosure is capable of detecting whether a use time of a phone number stored in a contact record is greater than a use term of the phone number. When the use time is greater than the use term, the terminal automatically deletes the phone number from the contact record, thereby assisting a user of the terminal to manage an address book with convenience.

In the embodiments of the present disclosure, the terminal may be a smart terminal having an address book function. For example, the terminal may be a smart phone, a tablet computer, a personal digital assistant (PDA), an electronic book reader, a multimedia player or the like. The smart terminal is generally installed with an address book application. One or a plurality of contacts and user information corresponding to the contacts are stored in a contact record in the address book. The user information generally includes at least a user name, and one or more phone numbers. For example, when the smart terminal is capable of providing a multi-SIM card function or a virtual SIM card function, the user information may include a plurality of phone numbers of the user. The user information may further include a fax number, an instant messaging account, for example, a Miliao account, a QQ account, a Weixin account or the like, an Email address, a personal homepage, a company address, a residential address, birthday, and like information.

When a terminal (called end) receives a call connection request from another terminal (calling end), the called end may acquire an incoming phone number according to the call connection request. If the incoming phone number has been stored in the above contact record, a target contact corresponding to the incoming phone number may be determined, and the called end may display in a call incoming interface a user name of the target contact, such that a user of the called end knows the identity of the calling end who initiates the call connection request.

Generally, a user of a terminal needs to manage the above contact record through, for example, adding a contact and contact information corresponding to the contact, or modifying contact information, or deleting a contact, or the like. The embodiments of the present disclosure may be performed by a terminal for automatic managing phone numbers having a use term that are stored in the contact record. For example, a common application is to automatically manage temporary phone numbers of virtual SIM cards stored in the contact record.

After receiving a virtual SIM card service provided by a service provider, a terminal of a user (a calling user) is provided with a temporary phone number by the service provider. A virtual SIM card is a technology that stores file parameters of a traditional physical SIM card to a terminal. The virtual SIM card does not need a physical SIM card, and has functions similar to those of a physical SIM card. The functions of the virtual SIM card are implemented by using the processing functions of a smart terminal itself. For example, the SIM card functions may be implemented by a program function module of the smart terminal, using resources on the smart terminal. The smart terminal consistent with embodiments of the present disclosure may be any smart terminal having a virtual SIM card management function.

The temporary phone number provided by the virtual SIM card service generally has a predetermined use term, which varies with a selection of a user. For example, the use term may be one week, one month, five months or other time durations. If the temporary phone number has been stored in the address book of a smart terminal of a user, the temporary phone number will become invalid after the expiration date, which causes inconvenience to managing the address book of the user.

Hereinafter, a process of a contact record processing method according to an exemplary embodiment of the present disclosure is described with reference to FIG. 1. FIG. 1 is a flowchart illustrating a contact record processing method 100 according to an exemplary embodiment. The method 100 may be performed an aforementioned terminal, and include the following steps.

In step 101, the terminal detects whether a use time of a phone number stored in a contact record is greater than a use term of the phone number.

In some embodiments, the phone number may be a land-line telephone number, a phone number provided by a mobile service provider, a short number provided by short number cluster network service of a mobile service provider, a temporary phone number provided by a virtual service provider, or the like. The use time of the phone number may be a time when the terminal is performing the step 101. For example, the terminal may compare a present time (use time) with the last day of the use term of the phone number and determines whether or not the present time is after the last day of use term. When the present time is after the last day of the use term, the terminal determines that the use time of the phone number is greater than the use term of the phone number. In some embodiments, the terminal may compare a present time (use time) with the last time (minute or second) the phone number is allowed to be used. The definitions of the use time and use term are not limited to the examples provided above. The terminal may use other time, such as when the phone number is last used, stored, or manipulated, as the use time of a phone number.

The terminal may compare the use time of the phone number stored in a contact record with the use term of the phone number, to determine whether the use time is greater than the use term. If the use time is greater than the use term, the phone number becomes invalid, and may be deleted from the contact record. The terminal may determine the use term of the phone number in various manners. For example, the terminal may acquire the use term of the phone number from a user input. In one embodiment, the user of the terminal may query the owner of the phone number about the use term of the phone number and input the use term to the terminal. The terminal may determine, according to the use term, whether the phone number of the address book is invalid. In some embodiments, the use term may also be acquired from the service provider providing the virtual SIM card service.

Generally, the use term may be any time predetermined by a service provider, for example, a duration of one week, one month, five months, or the like, starting from a date on which the phone number is provided. The terminal may compare the use time of the phone number with the above defined use term. When the use time is greater than the use term, the phone number stored in the contact record is determined to become invalid. For example, assuming that the use term of the phone number stored in the terminal is three months, from May 1 to July 31, when detection is carried out on August 1, the terminal determines that the phone number becomes invalid and may be deleted since the date, August 1, is after the deadline, July 31, of the use term.

When detecting the use term, the terminal may carry out real-time detection or periodical detection, for example, detection at 12:00 p.m. each day, or the like.

In some embodiments, the use term of the phone number may vary. For example, the user who buys the phone number may buy more time to extend the use term by paying the service provider before the expiration of the original use term, such that the use term of the phone number is extended. In one embodiment, the method 100 further includes: step 103, in which the terminal periodically acquiring the use term in a predetermined period.

The predetermined period may be 5 days, 10 days, 30 days or the like, and a person skilled in the art may flexibly define the period according to actual needs, which is not limited herein. That is, the terminal acquires a use term of a phone number every 5 days, 10 days, 30 days, or the like.

In the illustrated embodiment, since the use term is acquired periodically, the use term may be timely updated where the use term is changed, such that the use term of the phone number is determined more accurately.

In some embodiments, the acquiring the use term in a predetermined period may include: periodically forwarding the phone number to a server end (server) in a predetermined period; and receiving a use term corresponding to the phone number from the server end.

In the illustrated embodiment, the use term may be acquired from the server end. The server end may be a server, or a service cluster formed of a plurality of servers, or a cloud computing service center. The server end may provide a virtual SIM card service or store user terms of phone numbers. In some embodiments, the server end providing the virtual SIM card service may be associated with the smart terminal. For example, when a user uses a Xiaomi mobile phone, the server end is a Xiaomi server end, which provides a virtual SIM card service. The user may log in to the Xiaomi server end via a defined user account. The user account may be a Xiaomi account or may be another account bound to the Xiaomi account, for example, a Baidu account or a QQ account or other user accounts, as long as the Xiaomi server end can be logged in to via these accounts.

When a user buys the virtual SIM card service at the server end, the server end records the use term of a phone number corresponding to a virtual SIM card provided to the user. The server end may provide the use term to another terminal that needs to store the phone number. Therefore, the terminal may upload a phone number to the server end, to receive the use term from the server end according to the phone number. In the illustrated embodiment, the manner of acquiring the use term from a server end is made easy and smarter, and may reduce user operations and bring great convenience to the user.

In step 102, the phone number is deleted from the contact record when the use time is greater than the use term.

When it is determined in step 101 that the use time of the phone number is greater than the use term, the phone number becomes invalid, and may be deleted from the contact record.

According to the above embodiment, a use term of a contact phone number stored in a contact record may be determined, and whether a use time of the contact phone number is greater than the use term of the contact phone number is determined. When the use time is greater than the use term, the contact phone number may be automatically deleted from the contact record. According to the present disclosure, the phone number having a use term is automatically deleted from the contact record when the use term is expired, thereby assisting a user to manage an address book with ease and bringing great convenience to the user.

Figure 2A:
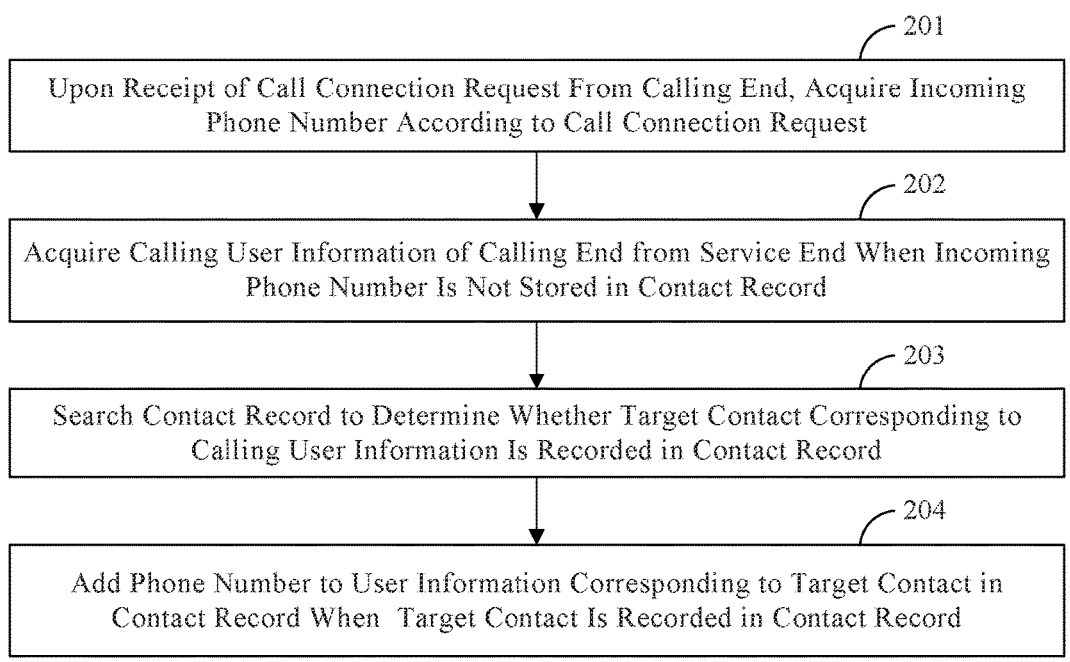
FIG. 2A is a flowchart illustrating another contact record processing method according to an exemplary embodiment of the present disclosure.

FIG. 2A is a flowchart illustrating another contact record processing method 200 according to an exemplary embodiment. The method 200 may be performed by a terminal. Based on the embodiment illustrated in FIG. 1, the method 200 is employed to automatically add a phone number to a contact record, and includes the following steps.

In step 201, upon receipt of a call connection request from a calling end, an incoming phone number is acquired according to the call connection request.

A phone call involves a calling end and a called end. The calling end is a call outgoing terminal, which generally makes a call. The called end is a call incoming terminal, which generally answers a call. In some embodiments of the present disclosure, the called end and the calling end may be any smart terminal having a call function. The method 200 is performed by a called end. The calling end initiates a call connection request to the called end. The call connection request generally includes an incoming phone number. The incoming phone number may be a landline telephone number, a phone number provided by a mobile service provider, a short number provided by short number cluster network service of a mobile service provider, a temporary phone number provided by a virtual service provider, or the like.

In step 202, calling user information of the calling end is acquired from a server end when the phone number is not stored in the contact record.

After enrolled in a virtual SIM card service, the calling end may use a temporary phone number to call a called end. When a call connection request is received by a smart terminal of the called user, the call connection request includes the temporary phone number of the calling end. In some embodiments, although contact information of the calling user is stored in the smart terminal of the called user, the temporary phone number the calling user is using is not included in the contact information of the calling user. Therefore, the called end cannot identify the calling user corresponding to the incoming temporary telephone number. In this case, the called end may acquire the calling user information of the calling end from the server end.

The server end may store user information of one or more users. For example, a smart terminal may upload one or a plurality of pieces of user information thereof to the server end after logging in to the server end. The user information generally includes at least a user name, and one or more phone numbers. For example, when the smart terminal is capable of providing a multi-SIM card function or a virtual SIM card function, the user information may include a plurality of phone numbers of the user. The user information may further include a fax number, an instant messaging account, for example, a Miliao account, a QQ account, a Weixin account or the like, an Email address, a personal homepage, a company address, a residential address, birthday, and like information. To accurately identify the calling user, the calling user information returned from the server end to the called end may be a phone number, an instant messaging account, an Email address, a personal homepage or like information.

In step 203, the called terminal searches the contact record to determine whether a target contact corresponding to the calling user information is stored in the contact record.

One or a plurality of contacts and user information corresponding to the contacts are stored in the contact record of the called terminal. When the calling user information is acquired from the server end, the called terminal can search for a contact corresponding to the calling user information. The called terminal may find a contact in the contact record based on the calling user information. The contact is the target contact, or the calling user.

In step 204, the phone number is added to user information corresponding to the target contact in the contact record when the target contact corresponding to the calling user information is stored in the contact record.

In some embodiments, the called end may receive a call connection request from a calling end. When the phone number of the calling end is not stored in a contact record of the called end, calling user information of the calling end is acquired from the server end. The called end determines whether a contact corresponding to the calling user information is stored in the contact record. If the called end determines that contact corresponding to the calling user information is stored in the contact record, it determines that the contact is the target contact that is the calling user initiating the call, and adds the phone number of the calling end to the user information stored in the contact record. According to the embodiments of the present disclosure, the phone number may be automatically added to user information corresponding to the target contact. According to the embodiments of the present disclosure, user information of a calling user may be acquired from a server end, and the calling user may be identified based on the user information. The phone number may be automatically stored, which provides convenience to the user.

In some embodiments, the acquiring calling user information of the calling end from the server end includes: sending the incoming phone number to the server end; and receiving calling user information corresponding to the incoming phone number from the server end.

The incoming phone number is a phone number corresponding to the calling end. In the illustrated embodiment, the incoming phone number may be sent from the called end to the server end, such that the server end may search for user information of the calling end according to the incoming phone number.

Figure 2B:
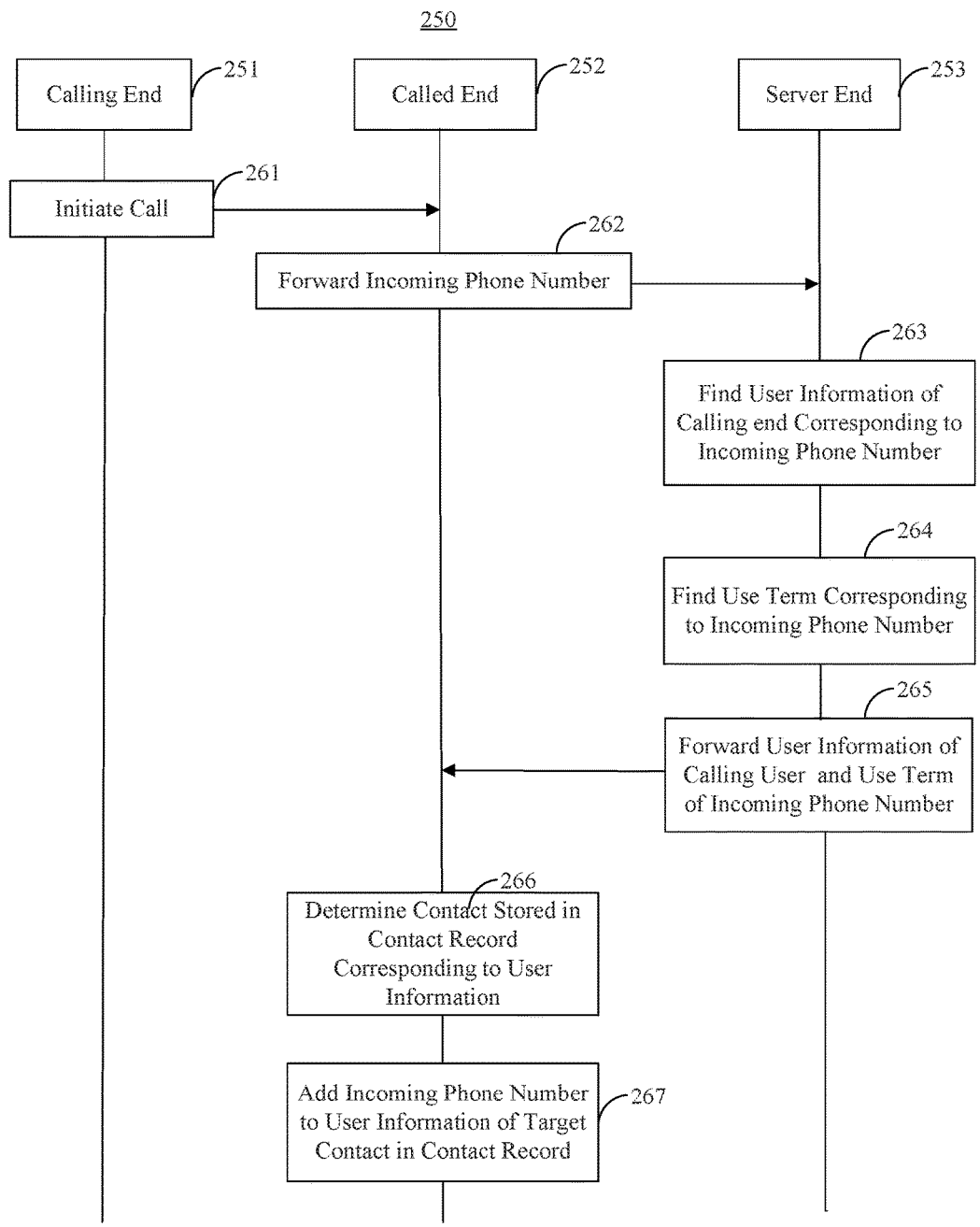
FIG. 2B is a flowchart illustrating another contact record processing method according to an exemplary embodiment of the present disclosure.

FIG. 2B illustrates a flowchart of another contact record processing method 250. A physical SIM card is installed in a calling end 251. The physical SIM card corresponds to a phone number. A calling user and the phone number are stored in a contact record of the called end 252. The calling end 251 may further have a virtual SIM card installed therein. The virtual SIM card corresponds to a temporary phone number. In step 261, the calling end 251 initiates a call to the called end 252 through the temporary phone number corresponding to the virtual SIM card. The called end 252 receives the call through a call connection request from the calling end 251. The called end 252 determines that the temporary phone number corresponding to the virtual SIM card is not recorded in the called end 252. In step 262, the called end forwards the incoming phone number to a server end 253, e.g., a Xiaomi server via the internet.

The server end 253 receives the incoming phone number, i.e., the above temporary phone number corresponding to the virtual SIM card. Since the server end 253 stores therein a corresponding relationship between user information and the temporary phone numbers, in step 263, the server end 253 searches and finds user information of the calling end 251. In step 264, the server end 253 further finds a use term corresponding to the incoming phone number.

In some embodiments, the user information of the calling end may include a user account, a user name, a phone number, an Email address, or the like of the calling user.

In step 265, the server end 253 forwards one or a plurality of pieces of user information to the called end 252. In some embodiments, user information returned to the called end 252 by the server end 253 may include all phone numbers of the user. Meanwhile, the server end 253 may further forward the use term of the temporary phone number to the called end 252.

Based on the user information corresponding to the incoming phone number, in step 266, the called end 252 search for a contact in its contact record. For example, the called end 252 may use the user name in the user information to search its contact record to find a contact that matches the user name. In some embodiments, the called end 252 may use all of the phone numbers of the calling user in the returned user information to search its contact record, to find a contact having one or more the phone numbers of the user information. The contact that matches the user name or has one of the phone numbers of the user information is the target contact. That is, by matching the user information with the stored contacts from a contact list in an address book of the called end, the called end 252 determines a target contact corresponding to the user information.

After the called end 252 finds the target contact corresponding to the user information, in step 267, the called end 252 adds the temporary phone number to the user information corresponding to the target contact in the contact record. In some embodiments, the user name of the calling user is displayed in an incoming call interface, such that the called user knows the identity of the calling user. Meanwhile, the called end 252 also acquires the use term of the temporary phone number from the server end 253, so that when the use term is reached, the temporary phone number is deleted from the contact record corresponding to the calling user.

Figure 3:
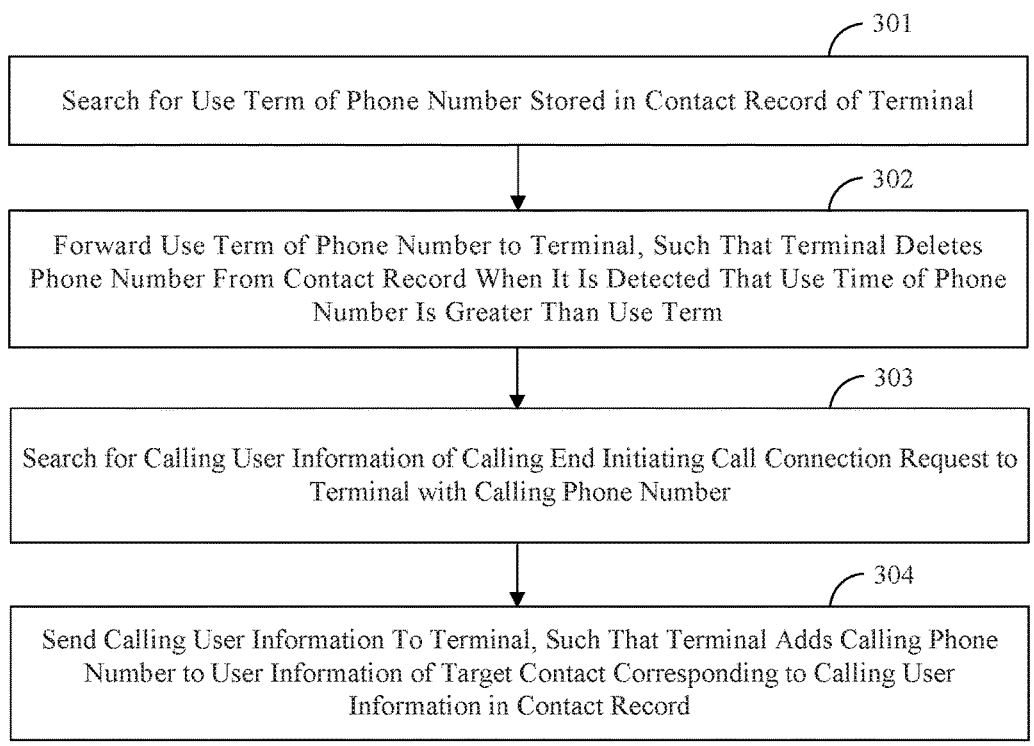
FIG. 3 is a flowchart illustrating another contact record processing method according to an exemplary embodiment of the present disclosure.

FIG. 3 is a flow chart illustrating another contact record processing method 300 according to an exemplary embodiment of the present disclosure. The method 300 may be performed by a server end, such as the server end 253. The method 300 include the following steps.

In step 301, the server end search for a use term of a phone number stored in a contact record of a terminal.

In step 302, the server end forwards the use term of the phone number to the terminal, such that the terminal deletes the phone number from the contact record when it is detected that use time of the phone number is greater than the use term.

In the embodiments of the present disclosure, the server end may be a server, or a service cluster formed of a plurality of servers, or a cloud computing service center. The server end may be associated with a smart terminal. For example, if a user uses a Xiaomi mobile phone, the server end is the Xiaomi server end. If a user uses an Apple mobile phone, the server end is the Apple server end. When the server end is the Xiaomi server end, the user may log in to the Xiaomi server end via a user account. The user account may be a Xiaomi account, or other accounts bound to the Xiaomi account, for example, a Baidu account, a QQ account and the like, as long as the Xiaomi server end can be logged in to via these accounts.

Because the user buys the virtual SIM card service in the server end to obtain a temporary phone number, the server end may record the use term of the temporary phone number provided to the user. The server end may provide the use term to terminals associated with other users that store the temporary telephone number, such that the terminals of the other users delete the temporary phone number from their contact records when detecting that a use time of the temporary phone number is greater than the use term.

According to the above embodiment, the server end in this embodiment may look for a use term corresponding to a phone number and provides the use term to a terminal, such that the terminal deletes the phone number from its contact record when detecting that a use time of the phone number is greater than the use term, thereby assisting a user to manage an address book with ease.

In some embodiments, searching for a use term of a phone number stored in a contact record of a terminal includes: receiving a phone number provided by the terminal; and searching a first predetermined relationship table for a use term corresponding to the phone number. A corresponding relationship between phone numbers and use terms is recorded in the first predetermined relationship table.

In some embodiments, the server end may store a corresponding relationship between phone numbers and use terms by establishing a first predetermined relationship table. When a terminal needs to acquire a use term, the server end may search for a corresponding use term from the predetermined relationship table according to the phone number sent by the terminal. The server end finds the use term of the phone number, it forwards the use term to the terminal.

In some embodiments, the method 300 may further include the following steps.

In step 303, the server end searches for calling user information of a calling end initiating a call connection request to the terminal with a calling phone number.

In step 304, the server end sends the calling user information to the terminal, such that the terminal adds the calling phone number to user information of a target contact corresponding to the calling user information in the contact record.

In the embodiments of the present disclosure, a smart terminal may forward one or a plurality of pieces of user information to the server end after logging in to the server end. The user information generally includes at least a user name, and one or more phone numbers. For example, when the smart terminal is capable of providing a multi-SIM card function or a virtual SIM card function, the user information may include a plurality of phone numbers of the user. The user information may further include a fax number, an instant messaging account, for example, a Miliao account, a QQ account, a Weixin account or the like, an Email address, a personal homepage, a company address, a residential address, birthday, and like information. In one embodiment, the calling user information returned by the server end to the terminal may be a phone number, an instant messaging account, an Email address, a personal homepage or the like information.

The server end may send calling user information to the terminal, and the terminal adds the phone number to user information of a target contact corresponding to the calling user information in the contact record, such that upon receipt of a call initiated by the calling end using a temporary phone number, the terminal automatically adds the temporary phone number to its contact record.

In some embodiments, the searching calling user information of a calling end initiating a call connection request to the terminal may include: receiving an incoming phone number from the terminal; and searching calling user information corresponding to the incoming phone number in a second predetermined relationship table. A corresponding relationship between user information and phone numbers are recorded in the second predetermined relationship table.

In the embodiments of the present disclosure, the user information may include various information, such as a phone number, a user name, a user account and the like. The server end may record a corresponding relationship between user information and phone numbers or the like of terminals. In some embodiments, the server end may record a corresponding relationship of user information by establishing a second predetermined relationship table.

For example, a predetermined relationship table is illustrated in Table 1, which includes partial user information recorded in the server end.

| User Information | User 1 | User 2 | User 3 |
| --- | --- | --- | --- |
| Xiaomi Account | 11110 | 11120 | 11130 |
| Smart Terminal | Smart Terminal 1 (MAC Address 1) | Smart Terminal 2 (MAC Address 2) | Smart Terminal 3 (MAC Address 3) |
| User Name | Mr. Zhang San | Mr. Li Si | Mr. Wang Wu |
| Phone Number 1 | 13588881111 | 13688882222 | 15988883333 |
| Phone Number 2 | 55551111 | 55552222 | 55553333 |
| Miliao Account | 666611 | 666622 | 666633 |
| Email Address | 666611@xiaomi.com | 666622@xiaomi.com | 666633@xiaomi.com |

As illustrated in Table 1, user information of three users are recorded. The recorded user information includes a Xiaomi account, a smart terminal (using the MAC address as a unique identity), a user name, a phone number 1, a phone number 2, a Miliao account, and an Email address. The server end records the corresponding relationship between the users and the user information of each user in the table.

The first and second predetermined relationship tables are used in two corresponding relationships: a corresponding relationship between phone numbers and use terms, and a corresponding relationship between user information and phone numbers, respectively. In some embodiments, since the user information may include phone numbers, the server end may establish one data recording table to record the above two corresponding relationships.

In the embodiments of the present disclosure, the server end may record a corresponding relationship between phone numbers and user information by establishing a second predetermined relationship table. When a terminal needs to acquire calling user information, the server end may search for corresponding calling user information from the second predetermined relationship table according to the incoming phone number sent by the terminal, and sends the calling user information to the terminal.

Figure 4:
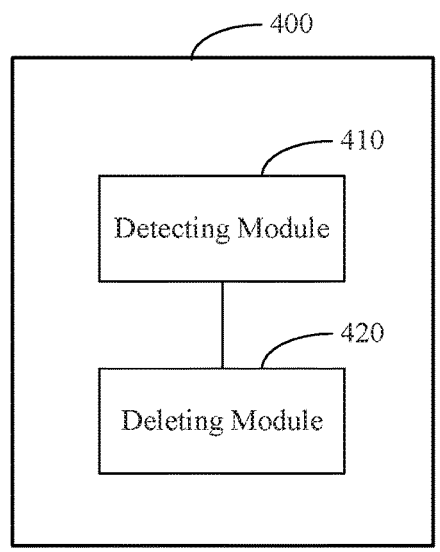
FIG. 4 is a block diagram illustrating a contact record processing apparatus according to an exemplary embodiment of the present disclosure.

FIG. 4 is a block diagram of a contact record processing apparatus 400 according to an exemplary embodiment of the present disclosure. The apparatus 400 includes: a detecting module 410 and a deleting module 420.

The detecting module 410 is configured to detect whether a use time of a phone number stored in a contact record is greater than a use term of the phone number.

The deleting module 420 is configured to delete the phone number from the contact record when the use time of the phone number is greater than the use term.

According to the above embodiment, whether use time of the phone number is greater than the use term of the phone number is detected. When the use time is greater than the use term, the phone number is automatically deleted from the contact record. According to the present disclosure, the phone number having a use term is automatically deleted from the contact record when the use term is expired, thereby assisting a user to manage an address book with ease.

Figure 5:
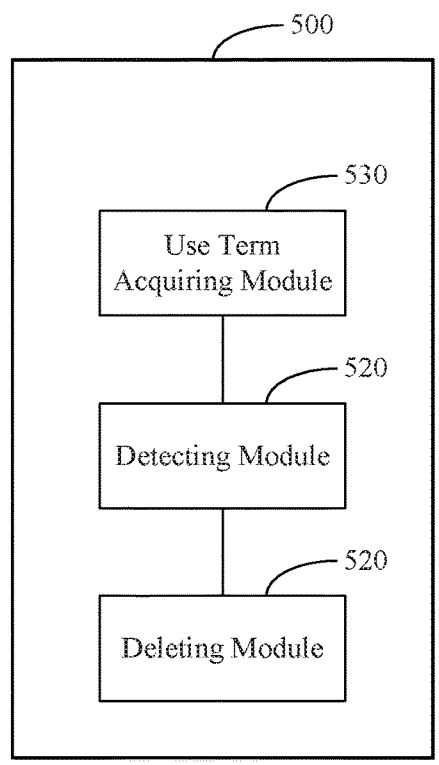
FIG. 5 is a block diagram illustrating another contact record processing apparatus according to an exemplary embodiment of the present disclosure.

FIG. 5 is a block diagram illustrating another contact record processing apparatus 500 according to an exemplary embodiment of the present disclosure. The apparatus 500 include a detecting module 510, a deleting module 520, and a use term acquiring module 530. The detecting module 510 and a deleting module 520 are similar to the detecting module 410 and deleting module 420, respectively, so that the detail functions of them are omitted herein.

The use term acquiring module 530 is configured to periodically acquire the use term in a predetermined period.

In the embodiments, since the use term is acquired in a predetermined period, e.g., 12 hours, one day, or two days, the use term may be timely updated where the use term is changed, such that whether the use term of the phone number is expired is determined more accurately.

Figure 6:
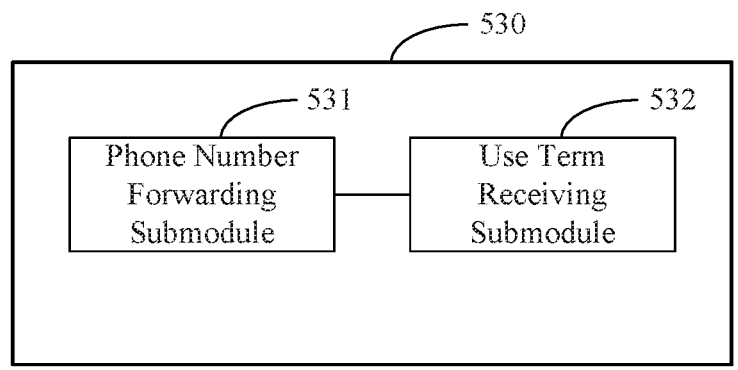
FIG. 6 is a block diagram illustrating the use term acquiring module shown in FIG. 5, according to an exemplary embodiment of the present disclosure.

FIG. 6 is a block diagram illustrating the use term acquiring module 530 according to an exemplary embodiment of the present disclosure. The use term acquiring module 530 includes: a phone number forwarding submodule 531 and a use term receiving submodule 532.

The phone number forwarding submodule 531 is configured to periodically forward the phone number to a server end in a predetermined period.

The use term receiving submodule 532 is configured to receive from the server end a use term obtained according to the phone number forwarded by the phone number forwarding submodule 531.

Figure 7:
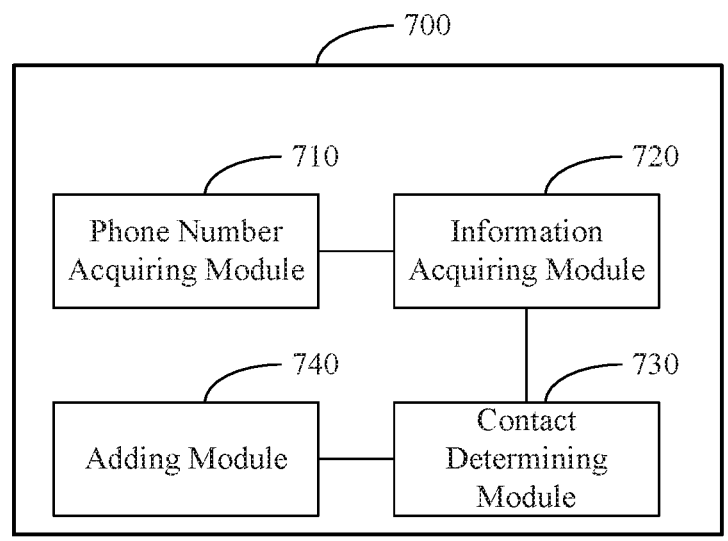
FIG. 7 is a block diagram illustrating another contact record processing apparatus according to an exemplary embodiment of the present disclosure.

FIG. 7 is a block diagram illustrating another contact record processing apparatus 700 according to an exemplary embodiment of the present disclosure. Based on the embodiment illustrated in FIG. 4, the apparatus 700 includes: a phone number acquiring module 710, an information acquiring module 720, a contact determining module 730, and an adding module 740.

The phone number acquiring module 710 is configured to, upon receipt of a call connection request from a calling end, acquire an incoming phone number according to the call connection request.

The information acquiring module 720 is configured to acquire calling user information of the calling end from a server end when the incoming phone number acquired by the phone number acquiring module 710 is not stored in a contact record.

The contact determining module 730 is configured to determine whether a target contact corresponding to the calling user information acquired by the information acquiring module 720 is recorded in the contact record, where the contact record includes one or a plurality of contacts and user information corresponding to the contacts.

The adding module 740 is configured to add the incoming phone number to user information corresponding to the target contact when it is determined that the target contact is recorded in the contact record.

In the illustrated embodiments, the called end receives a call connection request from a calling end. When the phone number is not stored in a contact record of the called end, the called end acquires calling user information of the calling end from the server end. The called end determines a corresponding target contact in the contact record according to the calling user information. The phone number can be automatically added to user information corresponding to the target contact. More user information of a calling user may be acquired from a server end, so that the calling user may be identified and the incoming phone number may be automatically stored.

Figure 8:
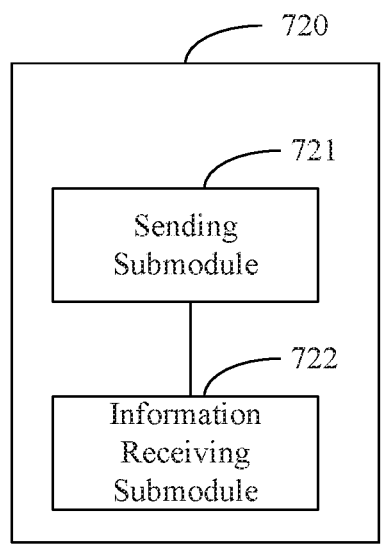
FIG. 8 is a block diagram illustrating the information acquiring module shown in FIG. 7, according to an exemplary embodiment of the present disclosure.

FIG. 8 is a block diagram illustrating the information acquiring module 720 according to an exemplary embodiment of the present disclosure. Based on the embodiment as illustrated in FIG. 4, the information acquiring module 720 includes: a sending submodule 721 and an information receiving submodule 722.

The sending submodule 721 is configured to send the incoming phone number to the server end.

The information receiving submodule 722 is configured to receive, from the server end, calling user information obtained according to the incoming phone number sent by the sending submodule.

In the illustrated embodiment, the server end stores user information corresponding to a plurality of users. When an incoming phone number can be sent to the server end, the server end searches for user information of the calling end according to the incoming phone number.

Figure 9:
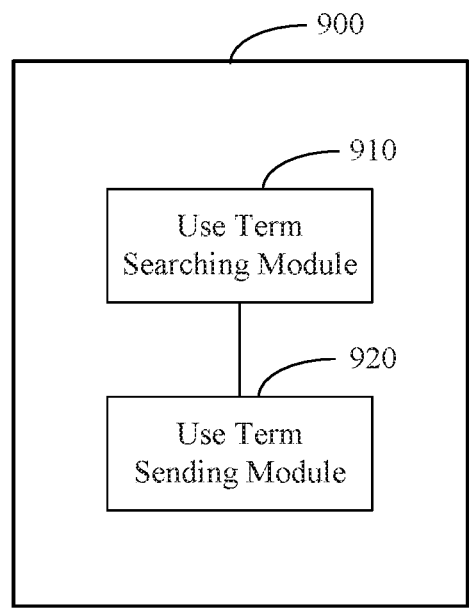
FIG. 9 is a block diagram illustrating another contact record processing apparatus according to an exemplary embodiment of the present disclosure.

FIG. 9 is a block diagram of another contact record processing apparatus 900 according to an exemplary embodiment of the present disclosure. The apparatus 900 may be a server at a server end, and includes: a use term searching module 910 and a use term sending module 920.

The use term searching module 910 is configured to search for a use term of a phone number.

The use term sending module 920 is configured to send the use term to a terminal, such that the terminal deletes the phone number from the contact record of the terminal when it is detected that a use time of the phone number is greater than the use term.

In the illustrated embodiment, the server end may search for a use term corresponding to a phone number and provide the use term to the terminal, such that the terminal deletes the phone number from the contact record when detecting that a use time of the phone number is greater than the use term, thereby assisting a user to manage an address book with ease.

Figure 10:
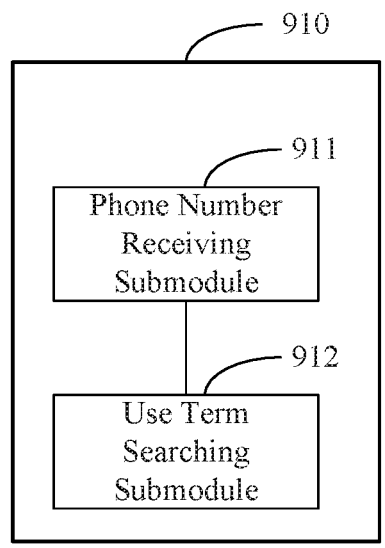
FIG. 10 is a block diagram illustrating the use term searching module shown in FIG. 9, according to an exemplary embodiment of the present disclosure.

FIG. 10 is a block diagram illustrating the use term searching module 8910 shown in FIG. 9, according to an exemplary embodiment of the present disclosure. Based on the embodiment illustrated in FIG. 9, the use term searching module 910 includes: a phone number receiving submodule 911 and a use term searching submodule 912.

The phone number receiving submodule 911 is configured to receive a phone number sent by a terminal.

The use term searching submodule 912 is configured to search a use term corresponding to the phone number received by the phone number receiving submodule 911. In some embodiments, the use term searching submodule 912 may search for the use term in a database of the server end. For example, the database may include a first predetermined relationship table, which stores a corresponding relationship between phone numbers and use terms.

In the illustrated embodiment, the server end may record/store a corresponding relationship between phone numbers and use terms through a first predetermined relationship table. When a terminal needs to acquire a use term, the server end may search for the corresponding use term in the first predetermined relationship table according to the phone number sent by the terminal, and send the use term to the terminal.

Figure 11:
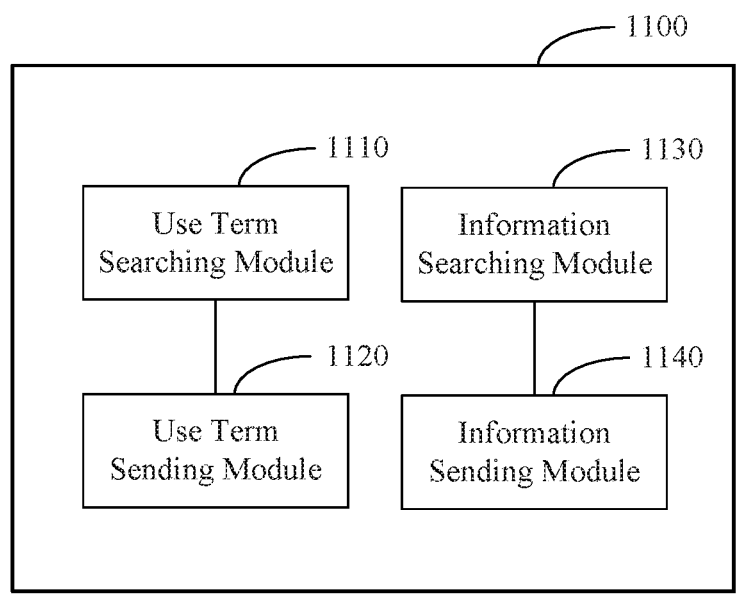
FIG. 11 is a block diagram illustrating another contact record processing apparatus according to an exemplary embodiment of the present disclosure.

FIG. 11 is a block diagram illustrating another contact record processing apparatus 1100 according to an exemplary embodiment of the present disclosure. The apparatus 1100 includes a use term searching module 1110, a use term sending module 1120, an information searching module 1130, and an information sending module 1140. The use term searching module 1110 and the use term sending module 1120 are similar to the use term searching module 910 and the use term sending module 920 shown in FIG. 9, respectively, and the details of their functions and actions are omitted herein.

The information searching module 1130 is configured to search for calling user information of a calling end initiating a call connection request to a terminal, based on a phone number forwarded from the terminal.

The information sending module 940 is configured to send the calling user information searched by the information querying module 930 to the terminal, such that the terminal adds the phone number to user information of a target contact corresponding to the calling user information in a contact record of the terminal.

In the illustrated embodiment, the server end forwards calling user information to the terminal, and the terminal adds the phone number to user information of a target contact corresponding to the calling user information in the contact record, such that upon receipt of a call initiated by the calling end by using a temporary phone number, the terminal automatically adds the temporary phone number to the contact record.

Figure 12:
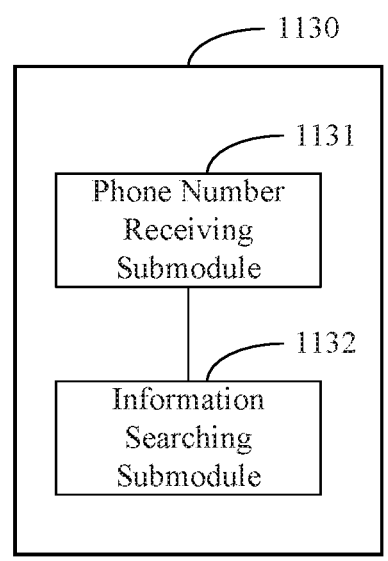
FIG. 12 is a block diagram illustrating the information searching module shown in FIG. 11, according to an exemplary embodiment of the present disclosure.

FIG. 12 is a block diagram illustrating the information searching module 1130 according to an exemplary embodiment of the present disclosure. The information searching module 1130 includes: a phone number receiving submodule 1131 and an information searching submodule 1132.

The phone number receiving submodule 1131 is configured to receive an incoming phone number provided by the terminal.

The information querying submodule 1132 is configured to search for calling user information corresponding to the incoming phone number received by the phone number receiving module 1131 in a database of the server end. For example, the database includes a second predetermined relationship table that stores a corresponding relationship between user information and phone numbers.

In the illustrated embodiment, the server end may store a corresponding relationship between phone numbers and user information through a second predetermined relationship table. When a terminal needs to acquire calling user information, the server end may search for the corresponding calling user information in the second predetermined relationship table according to the incoming phone number sent by the terminal, and return the calling user information to the terminal.

The present disclosure further provides a contact record processing apparatus. The apparatus includes a processor and a memory for storing instructions executable by the processor. The processor is configured to perform one or more steps of the methods explained above.

Specific implementation of functions and effects of various modules and submodules in the above apparatuses may be referenced to the implementation of the corresponding steps in the methods, which is thus not described herein any further.

With respect to the apparatus embodiments, since the apparatus embodiments are based on the method embodiments, relevant parts may be referenced to the equivalents in the method embodiments. The above-described apparatus embodiments are merely exemplary only. The modules or submodules illustrated as separate components may be or may not be physically independent of each other. Part of or all of the modules or submodules may be selected as required to implement the technical solutions disclosed in the embodiments of the present disclosure.

Figure 13:
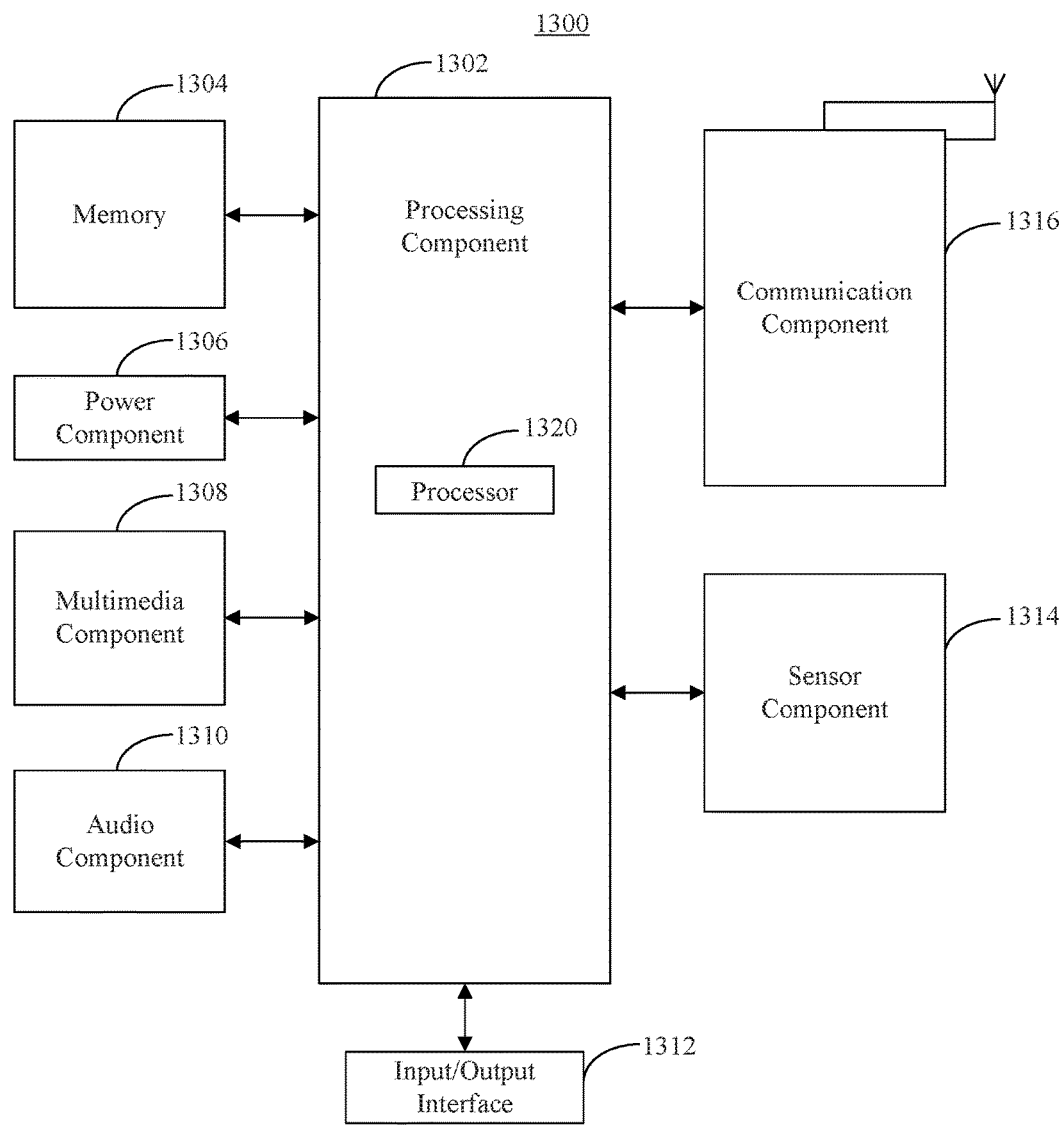
FIG. 13 is a block diagram illustrating an apparatus for processing a contact record according to an exemplary embodiment of the present disclosure.

FIG. 13 is a block diagram illustrating an apparatus 1300 for processing a contact record according to an exemplary embodiment of the present disclosure. For example, the apparatuses 400 and 500 shown in FIGS. 4 and 5, respectively, can be implemented by the apparatus 1300. For example, the apparatus 1300 may be a mobile phone, a computer, a digital broadcast terminal, a messaging device, a gaming console, a tablet, a medical device, exercise equipment, a personal digital assistant, or the like having a routing function.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the apparatus 1300, such as the operations associated with display, telephone calls, data communications, camera operations, and recording operations. The processing component 1302 may include one or more processors 1320 to execute instructions to perform all or a part of the steps in the above-described methods. In addition, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operations of the apparatus 1300. Examples of such data include instructions for any application or method operated on the apparatus 1300, contact data, phonebook data, messages, pictures, videos, and the like. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power supplies, and other components associated with the generation, management, and distribution of power in the apparatus 1300.

The multimedia component 1308 includes a screen providing an output interface between the apparatus 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive external multimedia data while the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, or a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and a peripheral interface module, such as a keyboard, a click wheel, a button, or the like. The buttons may include, but are not limited to, a home button, a volume button, a starting button, and a locking button.

The sensor component 1314 includes one or more sensors to provide status assessments of various aspects of the apparatus 1300. For example, the sensor component 1314 may detect an open/closed status of the apparatus 1300, relative positioning of components, e.g., the display and the keypad, of the apparatus 1300; and the sensor component 1314 may further detect a change in position of the apparatus 1300 or a component of the apparatus 1300, a presence or absence of user contact with the apparatus 1300, an orientation or an acceleration/deceleration of the apparatus 1300, and a change in temperature of the apparatus 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, a microwave sensor, or a temperature sensor.

The communication component 1316 is configured to facilitate wired or wireless communications between the apparatus 1300 and other devices. The apparatus 1300 may access a wireless network based on a communication standard, such as WiFi, 3Q or 4Q or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described contact record processing methods.

In exemplary embodiments, there is also provided a non-transitory computer-readable storage medium including instructions, such as included in the memory 1304, executable by the processor 1320 in the apparatus 1300, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

The present disclosure also provides a non-transitory computer-readable storage medium. When instructions stored in the storage medium are executed by a processor of a terminal, the terminal is caused to perform the contact record processing methods explained above.

Figure 14:
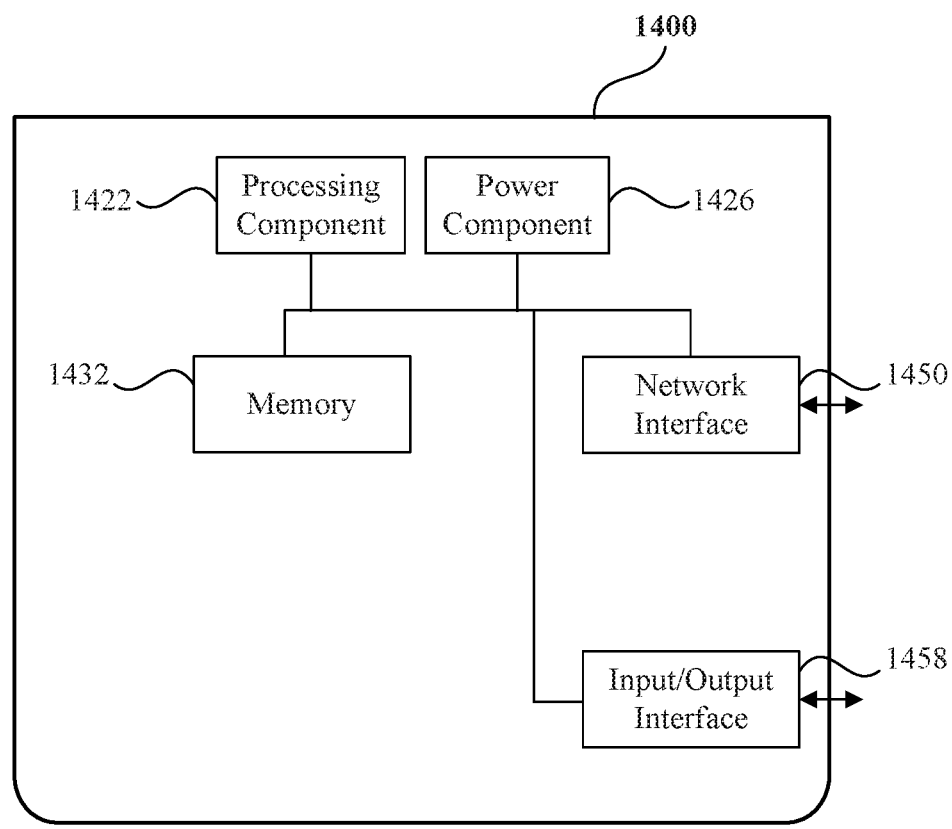
FIG. 14 is a block diagram illustrating another apparatus for processing a contact record according to an exemplary embodiment of the present disclosure.

FIG. 14 is a block diagram illustrating an apparatus 1400 for processing a contact record according to an exemplary embodiment of the present disclosure. For example, the apparatuses 900 and 1100 shown in FIGS. 9 and 11, respectively, can be implemented by the apparatus 1400. For example, the apparatus 1400 may be provided as a server. Referring to FIG. 14, the apparatus 1400 includes a processing component 1422, which further includes one or more processors and memory resources represented by a memory 1432, configured to store instructions executable by the processing component 1422, for example, applications. The applications stored in the memory 1432 may include one or more than one module each corresponding to a group of instructions. In addition, the processing component 1422 is configured to execute the instructions, to perform the above contact record processing methods.

The apparatus 1400 may further include: a power component 1426, configured to perform power management in the apparatus 1400; a wired or wireless network interface 1450 configured to connect the apparatus 1400 to the network; and an input/output (I/O) interface 1458. The apparatus 1400 may operate an operating system stored in the memory 1432, for example, Windows Server™, Mac OS X™, Unix™, Linux™, FreeBSD™, or the like.

Other embodiments of the present disclosure will be apparent to those skilled in the art from consideration of the specification and practice disclosed herein. This application is intended to cover any variations, uses, or adaptive variations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A contact record processing method, comprising:
    upon receipt of a call connection request from a calling end by a terminal, acquiring, by the terminal, an incoming phone number of the calling end according to the call connection request;
    determining, by the terminal, whether the incoming phone number is stored in a contact database in the terminal;
    in response to determining that the incoming phone number is not stored in the contact database, forwarding, by the terminal, the incoming phone number to a server end;
    receiving, by the terminal from the server end, calling user information of the calling end and a use term of the incoming phone number from the server end;
    storing, by the terminal, the incoming phone number, the calling user information and the use term in a contact record in the contact database;
    periodically acquiring, by the terminal from the server end, an updated use term of the incoming phone number stored in the contact record in the terminal;
    detecting, by the terminal, whether a use time of the incoming phone number stored in the contact record in the terminal is greater than the use term or the updated use term of the incoming phone number, wherein the use time indicates a time period when the incoming phone number is allowed to be used by the terminal; and
    deleting, by the terminal, the incoming phone number from the contact record when the use time is greater than the use term or the updated use term.

2. The method according to claim 1, further comprising:
    searching the contact record to determine whether a target contact corresponding to the calling user information is recorded in the contact record; and
    adding the incoming phone number to user information corresponding to the target contact when the target contact is recorded in the contact record.

3. A terminal, comprising:
    a processor; and
    a memory for storing instructions executable by the processor; wherein the processor is configured to:
        upon receipt of a call connection request from a calling end by a terminal, acquire, by the terminal, an incoming phone number of the calling end according to the call connection request;
        determine whether the incoming phone number is stored in a contact database in the terminal;
        in response to determining that the incoming phone number is not stored in the contact database, forward the incoming phone number to a server end;
        receive calling user information of the calling end and a use term of the incoming phone number from the server end;
        store the incoming phone number, the calling user information and the use term in a contact record in the contact database;
        periodically acquire, from the server end, an updated use term of the incoming phone number stored in the contact record in the terminal;
        detect whether a use time of the incoming phone number stored in the contact record in the terminal is greater than the use term or the updated use term of the incoming phone number, wherein the use time indicates a time period when the incoming phone number is allowed to be used by the terminal; and
        delete the incoming phone number from the contact record when the use time is greater than the use term or the updated use term.

4. The terminal according to claim 3, wherein the processor is further configured to:
    search the contact record to determine whether a target contact corresponding to the calling user information is recorded in the contact record; and
    add the incoming phone number to user information corresponding to the target contact when the target contact is recorded in the contact record.

5. A non-transitory computer-readable storage medium having stored therein instructions that, when executed by one or more processors of a terminal, cause the terminal to perform:
    upon receipt of a call connection request from a calling end by a terminal, acquiring, by the terminal, an incoming phone number of the calling end according to the call connection request;
    determining, by the terminal, whether the incoming phone number is stored in a contact database in the terminal;
    in response to determining that the incoming phone number is not stored in the contact database, forwarding, by the terminal, the incoming phone number to a server end;
    receiving, by the terminal from the server end, calling user information of the calling end and a use term of the incoming phone number from the server end;
    storing, by the terminal, the incoming phone number, the calling user information and the use term in a contact record in the contact database;
    periodically acquiring, by the terminal from the server end, an updated use term of the incoming phone number stored in the contact record in the terminal;
    detecting, by the terminal, whether a use time of the incoming phone number stored in the contact record in the terminal is greater than the use term or the updated use term of the incoming phone number, wherein the use time indicates a time period when the incoming phone number is allowed to be used by the terminal; and
    deleting, by the terminal, the incoming phone number from the contact record when the use time is greater than the use term or the updated use term.

* * * * *